Oct. 17, 1967   J. B. REVELINO   3,347,100
DIFFERENTIAL PRESSURE TRANSDUCER
Filed Aug. 12, 1965   2 Sheets-Sheet 2
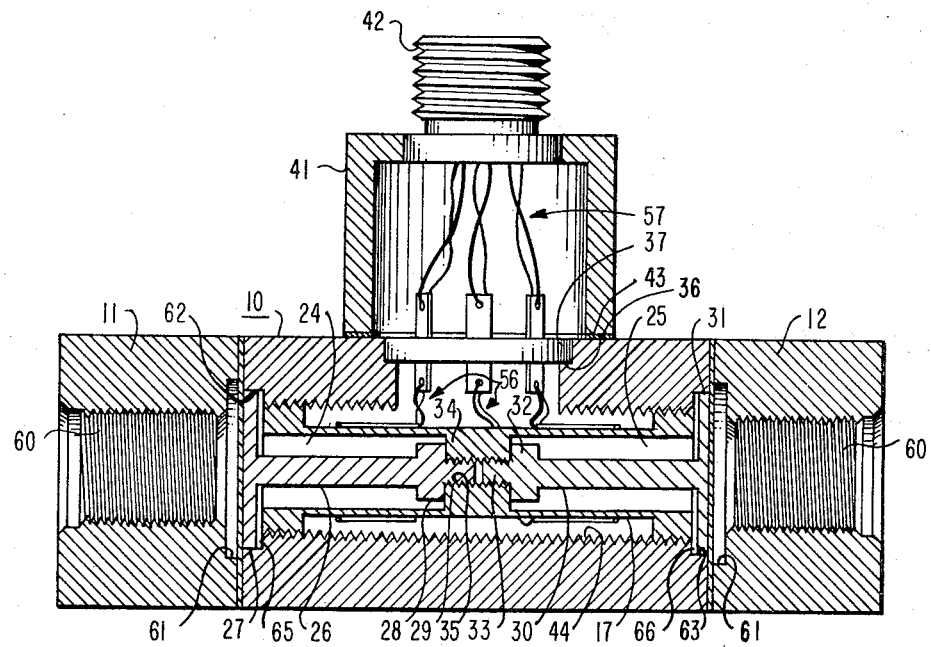
FIG. — 2
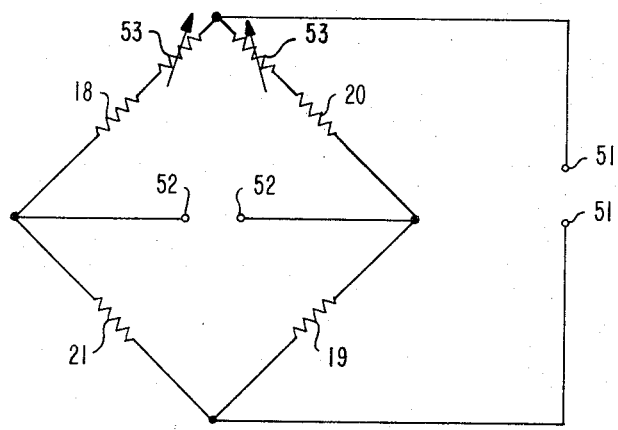
FIG. — 3
INVENTOR
JAMES B. REVELINO
BY Edward O. Ansell
George J. Netter
ATTORNEYS United States Patent Office 3,347,100
Patented Oct. 17, 1967

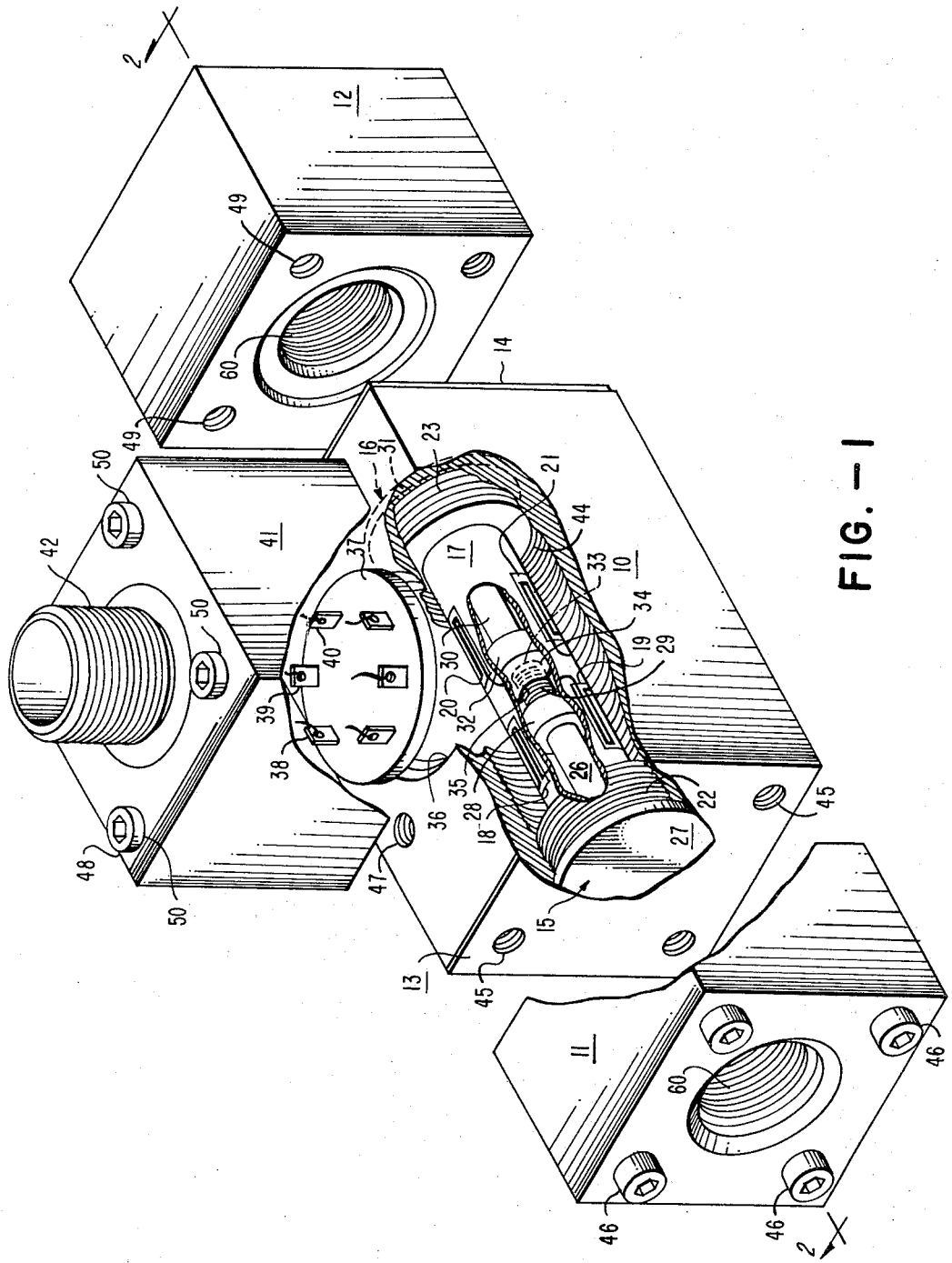

3,347,100
DIFFERENTIAL PRESSURE TRANSDUCER
James B. Revelino, Carmichael, Calif., assignor to Aerojet-General Corporation, El Monte, Calif., a corporation of Ohio
Filed Aug. 12, 1965, Ser. No. 479,118
6 Claims. (Cl. 73—398)

ABSTRACT OF THE DISCLOSURE

This disclosure concerns a differential pressure transducer comprising a tubular cylindrical flexure member received in a bore provided in a housing and fixedly secured at its opposite ends to the housing. The cylindrical flexure member is provided with a solid centrally-located internal flange. Force pistons are located at the opposite ends of the cylindrical flexure member and include respective piston rods extending within the cylindrical flexure member and rigidly attached to the solid centrally-located internal flange at the opposite sides thereof. Strain gage elements are mounted on the outer surface of the cylindrical flexure member, the strain gage elements being of the variable resistance type and being connected in a Wheatstone bridge electrical circuit which is balanced when the cylindrical flexure member is not placed under stress. Upon applying pressures from two sources of pressure to the respective pistons, the resulting force applied to the solid centrally-located internal flange of the cylindrical flexure member distorts the cylindrical flexure member to impart stress to the strain gage elements mounted thereon. The Wheatstone bridge is thereby unbalanced and develops an output signal which is proportional to the difference in magnitude between the two sources of pressure to which the pistons were respectively subjected, thereby enabling the pressure differential to be determined.

This invention relates to pressure transducers and, more particularly, to a transducer for sensing a difference in pressure between two input pressures applied thereto to produce an output signal related to the difference.

There is a need for a reliable and rugged pressure transducer which can sense a pressure or a pressure differential between two pressures where the pressure levels are above atmospheric pressure (p.s.i.g.) or above absolute pressure (p.s.i.a.). "P.s.i." refers to pounds per square inch. The "a" refers to an absolute pressure reference; the "g" refers to an atmospheric pressure reference. Where a differential pressure (p.s.i.d.) is measured, the symbols are defined as—pounds per square inch—differential or difference between two unknown pressures.

The need for ruggedness is most acute when the pressure levels encountered in a rocket engine environment are to be sensed.

This invention contemplates a pressure transducer of novel configuration which incorporates a tubular flexure member having a solid center and strain gage elements bonded to the exterior of the tubular flexure member. The configuration of the gages on the flexure member is such that pressures may be applied to either or both ends of the flexure member on force pistons rigidly attached to the solid center of said flexure member to stress or strain the bonded gages and produce in an electrical circuit connected thereto an output signal representative of these pressures in terms of the resistance changes due to the stress or strain on said gages. The electrical circuit is a Wheatstone bridge, the arms of which are formed from the gages and which is balanced with the transducer at rest. The bridge is unbalanced by the stress or strain of the gages due to distortion of the flexure member under pressure and an output voltage is developed in the output diagonal of the bridge which voltage is proportional to the differential pressure being measured.

The electrical circuit configuration of the gages employs two of the gages usually subjected to tensile strain forming two arms of the bridge and two of the gages usually subjected to compressional stresses forming the other two arms thereof.

It is, accordingly, an object of this invention to provide a rugged and reliable pressure transducer which develops an output signal proportional to the difference between two pressures applied thereto in ranges above atmospheric or absolute pressure for such high pressure environments as may be encountered in a rocket engine.

It is another object of this invention to provide a pressure transducer for high pressure environments incorporating a flexure member of tubular configuration having strain gage elements bonded thereto and having a solid center against which a force piston may act to deform the flexure member and apply a stress or strain to the gage elements to produce an output proportional to the force applied to the piston.

It is a further object of this invention to provide in a pressure transducer means for measurement of a pressure differential between two pressures applied to said transducer through a pair of pistons coacting against the solid center of a tubular flexural member of the transducer.

It is still another object of this invention to provide in a pressure transducer an elongated flexural element of tubular cross section having a solid center to which force pistons are rigidly attached from opposite ends thereof, said flexural element having strain gages bonded to the surface thereof which are interconnected in a Wheatstone bridge configuration to produce an output signal proportional to the difference between pressures applied to the force pistons.

It is a still further object of this invention to provide in a pressure transducer of the type described means to limit the deflection of a flexural member to a predetermined extent so as to avoid damage thereto in the event of excessive pressures being applied thereto.

These and other objects of this invention will be more fully understood from the specification which follows when taken together with the drawings wherein a preferred embodiment of the invention is shown and described.

In the drawings:

FIG. 1 is a perspective partly exploded and partly cutaway view of a preferred embodiment of the invention showing internal details in the cutaway portions thereof;

FIG. 2 is a cross-section through 2—2 of the invention as shown in FIG. 1 taken alongside a longitudinal axis thereof; and FIG. 3 is an electrical circuit schematic diagram of a representative interconnection of the strain gages used in the invention in a Wheatstone bridge configuration.

As may be seen in FIG. 1, a transducer according to this invention includes a relatively rigid central body section or housing 10 which is shown herein as rectangular but which may have any other cross-section such as circular, or hexagonal. At each end of body section 10, a respective end cap 11 or 12 is attached by suitable means. As shown, the end cap 11 is held in place on the body 10 by screws 46 inserted through holes in the end cap 11 and threaded into threaded holes 45 provided in the end of the body 10 adjacent thereto. Similarly, end cap 12 is held in place by screws (not shown) inserted through holes 49 in the end cap 12 and threaded into threaded holes provided in the end of the body 10 adjacent thereto. End cap 11 is separated from body 10 by a diaphragm 13. End cap 12 is separated from body 10 by a diaphragm 14. Central bores 60 in end caps 11 and 12 are threaded to receive nipples of external equipment from which respective sources of pressure to be sensed by the transducer are derived.

In the cross section shown in FIG. 2, counterbores 61 in bores 60 of end caps 11 and 12 may be seen providing an air gap on the end cap side of diaphragms 13 and 14.

A threaded bore 44 is located centrally through the longitudinal axis of body section 10. A counterbore 62 on the left end and another counterbore 63, on the right end of the threaded bore 44, both being larger in diameter than bore 44, provide a seating and limit stop surface for the heads 27 and 31 of force pistons 15 and 16, hereinafter more fully described.

A cylindrical flexure member 17 has threaded ends 22 at the left side and 23 at the right side thereof, both ends 22 and 23 being larger in diameter than the cylindrical flexure member 17. External threads on ends 22, 23 match those in bore 44 so that the flexure member can be threaded into bore 44.

The center 34 of flexure member 17 is solid and has a centered threaded bore 35 therein.

On the outer surface of flexure member 17 positioned on uniform quadrant portions thereof are bonded strain gage elements 18, 19, 20, 21. Gage elements 18, 19 are disposed to the left of center on the surface of flexure member 17 diametrically opposite one another. Gage elements 20, 21 are similarly positioned to the right of center on the surface of flexure member 17.

The strain gage elements 18–21 are inter-connected in a bridge circuit configuration as shown in FIG. 3 and further described below.

Inserted into bores 24 and 25 on opposite ends of flexure members 17 are a pair of force pistons 15 and 16. Piston 15 has a rod 26, a head 27, and an enlarged bearing end 28 on the opposite end of rod 26 from head 27. The extreme end of bearing end 28 has a threaded extension 29. Piston 16 is identical with piston 15 and includes rod 30, head 31, enlarged bearing end 32 and threaded extension 33. The external threads on extensions 29 and 33 match the internal threads in bore 35 of the solid center 34 in flexure element 17.

When pistons 15 and 16 are inserted from either end into bores 24 and 25, the threaded ends 29 and 33 are screwed up tightly against solid center 34 and are arranged so that the outer surfaces of heads 27 and 31 bear against respective diaphragms 13 and 14. At rest, this leaves a gap 65 in counterbore 62 to the inner surface of head 27 of force piston 15 and a similar gap 66 in counterbore 63 to the inner surface of head 31. The utility of gaps 65 and 66 is further defined below.

In the top of body 10, a bore 36 is provided for a terminal header plate 37 inserted therein. Header plate 37 is provided with terminal units 38, 39, 40, etc., to which electrical leads 56 from gages 18–21 are connected. Plate 37 is tightly pressed into the bore 36.

A cover 41 separated by a gasket 43 from body 10 is positioned over terminal header 37 and is held in place on body 10 by screws 48 inserted through holes 50 in the top of cover 41 and threaded into threaded holes 47 in the top of body 10.

An electrical connector 42 is wired by leads 57 to header terminals 38, 39, 40, etc.

A more complete understanding of the operation of the transducer described hereinabove with reference to the figures will be had from the following discussion thereof.

Considering first the principle of operation, it may be seen that flexure member 17 is subjected to tensile and compressive strains as pressure is applied to diaphragms 13 or 14 and thereby against heads 27 and 31. These strains are transmitted to strain gages 18–21 bonded on the outer surface of flexure member 17. Gages 18–21 are wired electrically in a Wheatstone bridge circuit as shown in FIG. 3 wherein if pressure is applied to head 27 through diaphragm 13 due to a fluid or gas under pressure entering bore 60 in end cap 11, with no corresponding pressure applied to diaphragm 14 through end cap 12, the strain gages 18 and 19 will become strained in tension, since the bearing end 28 of force piston 15 is pressing against solid center 34 of flexure member 17 to push the solid center 34 of flexure member 17 to the right of center. This also produces a compressional strain on gages 20–21. The extension of gages 18–19 increases their resistance, and the compression of gages 20–21 decreases their resistance to provide twice the variation in bridge output than would be anticipated from the stresses or strains upon a single pair of the gages.

Similarly, if the force were applied on diaphragm 14 with no force applied to diaphragm 13, gages 20–21 will be extended and gages 18–19 compressed with equivalent results in the Wheatstone bridge output but reversed in polarity.

Diaphragms 13 and 14 function to isolate the transducer from the pressure source being measured and applied through one of the pressure end caps 11 or 12. Diaphragms 13 and 14 seal the ends of body 10 and transmit the pressure over the area of the respective piston head 27 or 31 to provide the force required to strain the flexure member 17 as previously described.

As described above, where pressure is applied to one end of the transducer only with no change in the pressure applied to the other end thereof, the operation of the transducer is unidirectional. In fact, the system within body 10 can be sealed to contain a vacuum or some predetermined reference pressure level to measure pressures above atmospheric (p.s.i.g.) or above absolute (p.s.i.a.) pressures.

As illustrated in FIGS. 1 and 2, the transducer of this invention may function also as a differential transducer so that when two pressures are applied simultaneously at either end (this is on diaphragms 13 and 14) and each pressure is of a different value, the flexure member 17 reacts to the difference in pressure between the two sources applied to the transducer. The actual pressures applied can be extremely high in level, although the difference between the two pressures is relatively small. The transducer output will only be in response to the difference in pressure between the two pressure sources because the flexure member 17 is subjected only to strains proportional to the difference in pressure.

As pressure is applied to force pistons 15 and 16, the heads thereof are moved in counterbores 62 and 63 to close the respective gaps 65 and 66 therein.

Heads 27 and 31 of force positions 15 and 16 will respectively seat in counterbores 62, 63 at some pressure level dependent on the specific dimensions to which the gaps 65 and 66 have been set. Thus, pressures in excess of the values at which seating of either of the heads 27 and 31 may occur in its respective counterbore 62 or 63 will have no more effect upon flexure member 17, and the output will be limited to the maximum tension or compression which can be exerted up to the limit stops formed by counterbores 62 and 63 in threaded bore 44.

Accordingly, it can be seen that what has been described above is a pressure transducer incorporating a thin walled flexure member constrained at either end in a housing. The flexure member has a solid center and strain gages on the outer surface thereof to indicate tensile or compressional strains in the flexure member. Attached to the solid center within the flexure member are force pistons having respective enlarged piston heads disposed in a counterbore at each end of the housing which limits the travel thereof into the housing when respective pressures are applied to the force pistons to strain the flexure member. Pressure is applied to each of the piston heads through an isolating diaphragm so that the transducer may be sealed to contain a vacuum or a predetermined reference pressure. The pressure applied at one end of the transducer or the difference in the pressures applied at opposite ends of the transducer strain the flexure member to actuate changes in the resistance of the strain gages bonded to the flexure member. The strain gages are connected in a Wheatstone bridge resulting in an output signal proportional to the pressure or to the difference in pressures depending upon the use of the transducer.

So as to balance the Wheatstone bridge in a quiescent condition of the transducer against possible differences in individual strain gages, as may be seen in FIG. 3, variable resistance units 53 are connected in adjacent bridge elements such as 18 and 20 or 19 and 21 in series with the respective gage elements. A source of drive potential is applied to diagonal input terminals 51. The output of the Wheatstone bridge is taken across the opposite diagonal terminals 52 thereof. An indicator or sensor of some kind is connected to terminals 52, depending upon the nature of the drive signal applied to terminals 51. This indicator can be calibrated in terms of the pressure level indications to be observed, as p.s.i.a. or p.s.i.g. or p.s.i.d.

While there has been shown and described a preferred form of the invention, it will be understood by those skilled in the art that various changes may be made in the shape and arrangement of the several parts without departing from the spirit of the invention and that the invention is not to be limited except as provided for in the appended claims.

I claim:

1. A transducer for developing an electrical output signal proportional to the pressure differential of fluids applied to the opposite ends thereof, said transducer comprising:
   a housing having an axial threaded bore therethrough and a bore in the center of one surface of said housing perpendicular to and communicating with said axial bore;
   end caps having bores communicating with sources of fluid under pressure;
   diaphragms adapted to be positioned on either end of said housing between said end caps;
   force pistons, each having a head, a rod and an enlarged bearing pad on the end of said rod opposite from said head;
   a generally cylindrical relatively thin-walled flexure member having enlarged externally threaded end means, each said end means having a central bore for receiving said force pistons from opposite ends of said flexure member, and said flexure member having a solid central element to which said pads are rigidly attached;
   a counterbore in each opposite end of the axial bore in said housing, said flexure member being threadedly inserted in said axial bore so as to hold said enlarged end means fixedly in said axial bore in said housing, there being a gap between the heads of said pistons and said counterbores to limit the travel of said pistons into said flexure member;
   resistance-type strain gage elements bonded to the outer surface of said flexure member in a predetermined configuration and connected to a bridge circuit;
   a terminal header in said perpendicular bore in said housing, the terminals thereof connected with said bridge circuit of strain gage elements; and
   said end caps and said diaphragms being connected to opposite ends of said housing, said diaphragms being in contact with said piston heads and sealing said housing from said fluids under pressure entering said end caps,
   whereby, pressures of said fluids applied to said diaphragms press upon said force pistons to cause a deformation of said flexure member, thereby to strain said gage elements in proportion to the difference between the pressures applied and develop an electrical output signal in said bridge proportional to the unbalance of said bridge produced by said strains.

2. A transducer for measuring the difference in pressure between two pressure sources, said transducer comprising:
   a housing having an elongated bore therethrough,
   an elongated hollow flexure member received in the bore provided in said housing,
   said flexure member comprising a relatively thin cylindrical sleeve fixedly secured at each of its ends to said housing and having a thickened internal central portion extending radially inwardly thereof and disposed intermediate its ends,
   a pair of pistons respectively extending into said sleeve from the opposite ends thereof,
   each of said pistons comprising an elongated piston rod and an enlarged piston head on one end of said piston rod,
   the other end of each of said piston rods being fixedly secured to said thickened internal central portion of said sleeve at respective sides thereof,
   the enlarged piston heads being disposed outwardly of said sleeve at the respective opposite ends thereof,
   a pair of end caps respectively secured to said housing at the opposite ends thereof, each of said end caps having a bore therethrough in registration with the enlarged piston head of the piston corresponding thereto and respectively communicating with a separate source of fluid pressure,
   respective diaphragms interposed between said housing and each of said end caps, each of said diaphragms being in covering contacting relation to the enlarged piston head of the piston corresponding thereto and providing a seal between said housing and the respective end cap to prevent passage of fluid into said housing,
   means between each of said pistons and the respective opposite ends of said sleeve to limit the extent of movement of said pistons inwardly with respect to said sleeve, and
   resistance-type strain gage elements mounted on the outer surface of said sleeve in a predetermined array and being variable in resistance in response to distortion of said sleeve, said strain gage elements being connected in a Wheatstone bridge circuit having an output signal proportional to the distortion of said sleeve,
   whereby when fluid pressures are applied to the respective diaphragms through the bores in said end caps and the respective diaphragms transmit such pressures to the enlarged piston heads of the respective pistons, the resulting force applied to the thickened internal central portion of said sleeve distorts said sleeve to impart stress to said strain gage elements mounted thereon in proportion to the difference between the pressures applied to said diaphragms so as to develop an output signal from the Wheatstone bridge circuit which is proportional to the difference between the pressures applied to said diaphragms.

3. A transducer for measuring the difference in pressure between two pressure sources, said transducer comprising:
   a housing having an elongated bore therethrough,
   an elongated hollow flexure member received in the bore provided in said housing,
   said flexure member comprising a relatively thin cylindrical sleeve fixedly secured at each of its ends to said housing and having a thickened internal central portion extending radially inwardly thereof and disposed intermediate its ends,
   a pair of pistons respectively extending into said sleeve from the opposite ends thereof,
   each of said pistons comprising an elongated piston rod and an enlarged piston head on one end of said piston rod,
   the other end of each of said piston rods being fixedly secured to said thickened internal central portion of said sleeve at respective sides thereof, the enlarged piston heads being disposed outwardly of said sleeve at the respective opposite ends thereof, a pair of end caps respectively secured to said housing at the opposite ends thereof, each of said end caps having a bore therethrough in registration with the enlarged piston head of the piston correponding thereto and respectively communicating with a separate source of fluid pressure, respective diaphragms interposed between said housing and each of said end caps, each of said diaphragms being in covering contacting relation to the enlarged piston head of the piston corresponding thereto and providing a seal between said housing and the respective end cap to prevent passage of fluid into said housing, means defining a gap between each of said piston heads and the respective opposite ends of said sleeve such that the extent of movement of each of said pistons inwardly with respect to said sleeve is limited to the depth of the respective gap, and resistance-type strain gage elements mounted on the outer surface of said sleeve in a predetermined array and being variable in resistance in response to distortion of said sleeve, said strain gage elements being connected in a Wheatstone bridge circuit having an output signal proportional to the distortion of said sleeve, whereby when fluid pressures are applied to the respective diaphragms through the bores in said end caps and the respective diaphragms transmit such pressures to the enlarged piston heads of the respective pistons, the resulting force applied to the thickened internal central portion of said sleeve distorts said sleeve to impart stress to said strain gage elements mounted thereon in proportion to the difference between the pressures applied to said diaphragms so as to develop an output signal from the Wheatstone bridge circuit which is proportional to the difference between the pressures applied to said diaphragms.

4. A transducer for measuring the difference in pressure between two pressure sources, said transducer comprising:

a housing having an elongated bore therethrough, an elongated hollow flexure member received in the bore provided in said housing, said flexure member comprising a relatively thin cylindrical sleeve fixedly secured at each of its ends to said housing and having a thickened internal central portion extending radially inwardly thereof and disposed intermediate its ends, a pair of pistons respectively extending into said sleeve from the opposite ends thereof, each of said pistons comprising an elongated piston rod and an enlarged piston head on one end of said piston rod, the other end of each of said piston rods being fixedly secured to said thickened internal central portion of said sleeve at respective sides thereof, the enlarged piston heads being disposed outwardly of said sleeve at the respective opposite ends thereof, and resistance-type strain gage elements mounted on the outer surface of said sleeve in a predetermined array and being variable in resistance in response to distortion of said sleeve, said strain gage elements being connected in a Wheatstone bridge circuit having an output signal proportional to the distortion of said sleeve, whereby when pressures from the two pressure sources are applied to the outwardly disposed end surfaces of the enlarged piston heads of the respective pistons, the resulting force applied to the thickened internal central portion of said sleeve distorts said sleeve to impart stress to said strain gage elements mounted thereon in proportion to the difference between the pressures applied to the said piston heads so as to develop an output signal from the Wheatstone bridge circuit which is proportional to the difference between the pressures applied to said piston heads.

5. A transducer for measuring the difference in pressure between two pressure sources, said transducer comprising:

a housing having an elongated bore therethrough, an elongated hollow flexure member received in the bore provided in said housing, said flexure member comprising a relatively thin cylindrical sleeve having radially outwardly extending annular flanges at each of its ends threadably secured to said housing and having a thickened internal central portion extending radially inwardly thereof and disposed intermediate its ends, a pair of pistons respectively extending into said sleeve from the opposite ends thereof, each of said pistons comprising an elongated piston rod and an enlarged piston head on one end of said piston rod, the other end of each of said piston rods including an extension threadably secured within said thickened internal central portion of said sleeve and extending thereinto from respective sides thereof, the enlarged piston heads being disposed outwardly of the respective annular flanges at the opposite ends of said sleeve, and resistance-type strain gage elements mounted on the outer surface of said sleeve in a predetermined array and being variable in resistance in response to distortion of said sleeve, said strain gage elements being connected in a Wheatstone bridge circuit having an output signal proportional to the distortion of said sleeve, whereby when pressures from the two pressure sources are applied to the outwardly disposed end surfaces of the enlarged piston heads of the respective pistons, the resulting force applied to the thickened internal central portion of said sleeve distorts said sleeve to impart stress to said strain gage elements mounted thereon in proportion to the difference between the pressures applied to said piston heads so as to develop an output signal from the Wheatstone bridge circuit which is proportional to the difference between the pressures applied to said piston heads.

6. A transducer for measuring the difference in pressure between two pressure sources, said transducer comprising:

a housing having an elongated bore therethrough, an elongated hollow flexure member received in the bore provided in said housing, said flexure member comprising a relatively thin cylindrical sleeve having radially outwardly extending annular flanges at each of its ends threadably secured to said housing and having a thickened internal central portion extending radially inwardly thereof and disposed intermediate its ends, a pair of pistons respectively extending into said sleeve from the opposite ends thereof, each of said pistons comprising an elongated piston rod and an enlarged piston head on one end of said piston rod, the other end of each of said piston rods including an enlarged bearing collar and an extension projecting outwardly thereof, said enlarged bearing collars being disposed in abutment with said thickened internal central portion of said sleeve on respective sides thereof, said extensions being threadably secured within said thickened internal central portion of said sleeve and extending thereinto from the respective sides thereof, the enlarged piston heads being disposed outwardly of the respective annular flanges at the opposite ends of said sleeve, a pair of end caps respectively secured to said housing at the opposite ends thereof, each of said end caps having a bore therethrough in registration with the enlarged piston head of the piston corresponding thereto and respectively communicating with a separate source of fluid pressure, respective diaphragms interposed between said housing and each of said end caps, each of said diaphragms being in covering contacting relation to the enlarged piston head of the piston corresponding thereto and providing a seal between said housing and the respective end cap to prevent passage of fluid into said housing, means defining a gap between each of said piston heads and the respective annular flanges at the opposite ends of said sleeve such that the extent of movement of each of said pistons inwardly with respect to said sleeve is limited to the depth of the respective gap, and resistance-type strain gage elements mounted on the outer surface of said sleeve in a predetermined array and being variable in resistance in response to distortion of said sleeve, said strain gage elements being connected in a Wheatstone bridge circuit having an output signal proportional to the distortion of said sleeve, whereby when fluid pressures are applied to the respective diaphragms through the bores in said end caps and the respective diaphragms transmit such pressures to the enlarged piston heads of the respective pistons, the resulting force applied to the thickened internal central portion of said sleeve distorts said sleeve to impart stress to said strain gage elements mounted thereon in proportion to the difference between the pressures applied to said diaphragms so as to develop an output signal from the Wheatstone bridge circuit which is proportional to the difference between the pressures applied to said diaphragms.

References Cited

UNITED STATES PATENTS

| 2,886,678 | 5/1959 | Curtis | 338—4 |
| 3,240,065 | 3/1966 | Taber | 73—398 |

FOREIGN PATENTS

| 1,030,597 | 3/1953 | France. |

LOUIS R. PRINCE, *Primary Examiner.*

DONALD O. WOODIEL, *Assistant Examiner.*